US011856245B1

(12) United States Patent
Chundi et al.

(10) Patent No.: US 11,856,245 B1
(45) Date of Patent: Dec. 26, 2023

(54) SMART AUTOMATIC SKIP MODE

(71) Applicant: Rovi Guides, Inc., San Jose, CA (US)

(72) Inventors: Charishma Chundi, Andhra Pradesh (IN); Reda Harb, Bellevue, WA (US); Rajendra Pandey, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/865,785

(22) Filed: Jul. 15, 2022

(51) Int. Cl.
*H04N 21/2387* (2011.01)
*H04N 21/432* (2011.01)

(52) U.S. Cl.
CPC ..... *H04N 21/2387* (2013.01); *H04N 21/4325* (2013.01)

(58) Field of Classification Search
CPC ............ H04N 21/2387; H04N 21/4325
See application file for complete search history.

(56) References Cited

U.S. PATENT DOCUMENTS

| 9,621,956 | B2 | 4/2017 | Gaydou et al. | |
|---|---|---|---|---|
| 2010/0077435 | A1* | 3/2010 | Kandekar | H04N 9/8233 725/61 |
| 2017/0366859 | A1* | 12/2017 | Chimayan | H04N 21/47217 |
| 2020/0186895 | A1* | 6/2020 | Carlson | H04N 21/4334 |

* cited by examiner

*Primary Examiner* — Quoc A Tran
(74) *Attorney, Agent, or Firm* — Haley Guiliano LLP

(57) ABSTRACT

Systems and methods are provided for enabling a smart automatic skip mode during playback of a content item. A content item is generated for output at a first time at a computing device, and input associated with navigating the content item is received. Metadata associated with a plurality of segments of the content item is identified and, based on the input and the metadata, a segment to skip is identified. The segment to skip is skipped, and the content item is generated for output at a second time.

14 Claims, 12 Drawing Sheets

| Segment Identifier | Play State | Metadata - Actor | Metadata - Scene Type |
|---|---|---|---|
| 1 | Played | Null | Opening Credits |
| 56 | Skipped | Nicole Kidman | Romance |
| 70 | Playing | Hugh Grant | Comedy |
| 89 | | Nicole Kidman | Comedy |
| 130 | | Hugh Grant | Action |

FIG. 10

SMART AUTOMATIC SKIP MODE

BACKGROUND

The present disclosure is directed towards systems and methods for enabling a smart automatic skip mode during playback of a content item. In particular, systems and methods are provided herein for enabling a smart automatic skip mode based on identifying metadata associated with a content item.

SUMMARY

Content item delivery services, including over-the-top (OTT), streaming and video on demand (VOD) services, such as Netflix, Amazon Prime Video, Disney+ and Hulu, typically provide an application comprising a media player for consuming content items available on the service. The media player typically enables a user to navigate a content item that is being consumed, for example, by playing, pausing, fast-forwarding, rewinding and/or skipping a fixed amount, for example 10 seconds, through the content item. However, when operating navigation functions, users may become frustrated if, for example, they find that they have skipped too far ahead. Additionally, when performing additional navigation operations in response to one or more incorrect navigation operations, for example, when skipping too far ahead, these additional navigation operations will consume additional network bandwidth and/or processing resources. This problem may be compounded if a user is continually skipping similar parts of a content item.

To overcome these problems, systems and methods are provided herein for enabling a smart automatic skip mode based on identifying metadata associated with a content item.

Systems and methods are described herein for enabling a smart automatic skip mode during playback of a content item. In accordance with some aspects of the disclosure, a method is provided that includes generating, at a computing device, a content item for output at a first time and receiving input associated with navigating the content item. Metadata associated with a plurality of segments of the content item is identified, and a segment to skip is identified based on the input and the metadata. The identified segment is skipped, and the content item is generated for output at a second time.

In an example system, a user accesses an OTT platform via an application running on a smart television and selects a movie for playback. In the example, the user consistently skips through scenes of a man in a hospital bed. The content of these scenes is identified via metadata associated with the relevant scenes of the movie. It is identified that the user consistently skips scenes of a man in a hospital bed, and future scenes in the movie are automatically skipped, based, for example, on metadata that identifies the content of those scenes.

A selectable icon associated with the segment to skip may be generated for output, and the skipping may further comprise skipping the identified segment in response to receiving input associated with the selectable icon. A user profile associated with the content item may be identified, and identifying the segment to skip may be further based on the user profile. Identifying the metadata may further comprise identifying segments of the plurality of segments having common metadata, and identifying a segment to skip may further comprise, based on the common metadata, identifying a subset of the plurality of segments to skip. The skipping may further comprise, for each segment of the subset of segments, skipping a respective segment of the subset of segments as the content item progresses. A first input associated with navigating the content item may be received, and a second input to provide feedback associated with the first input may also be received. Identifying the metadata may further comprise tagging metadata based on the first input and the second input, and identifying a segment to skip may further comprise identifying a segment to skip based on the tagged metadata. Identifying the metadata may further comprise analyzing a frame of the content item via a trained machine learning model and identifying an element in the frame.

A request to receive an updated manifest file that does not include a reference to the segment to be skipped may be transmitted, and the updated manifest file may be received. Segments of the content item may be requested based on the updated manifest file. The content item may be a first content item, and a command may be to interrupt generating the first content item for output. A second content item may be generated for output. An updated manifest file may be received based on the segment to skip, and segments of the first content item may be requested based on the updated manifest file.

A progress bar associated with the content item and an indicator may be generated for output, where the indicator is associated with the progress bar and the indicator indicates the skipped segment of the content item. Generating the indicator may further comprise generating a selectable indicator and, in response to receiving input associated with selecting the indicator, the skipped segment may be navigated to.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

Figure 9:
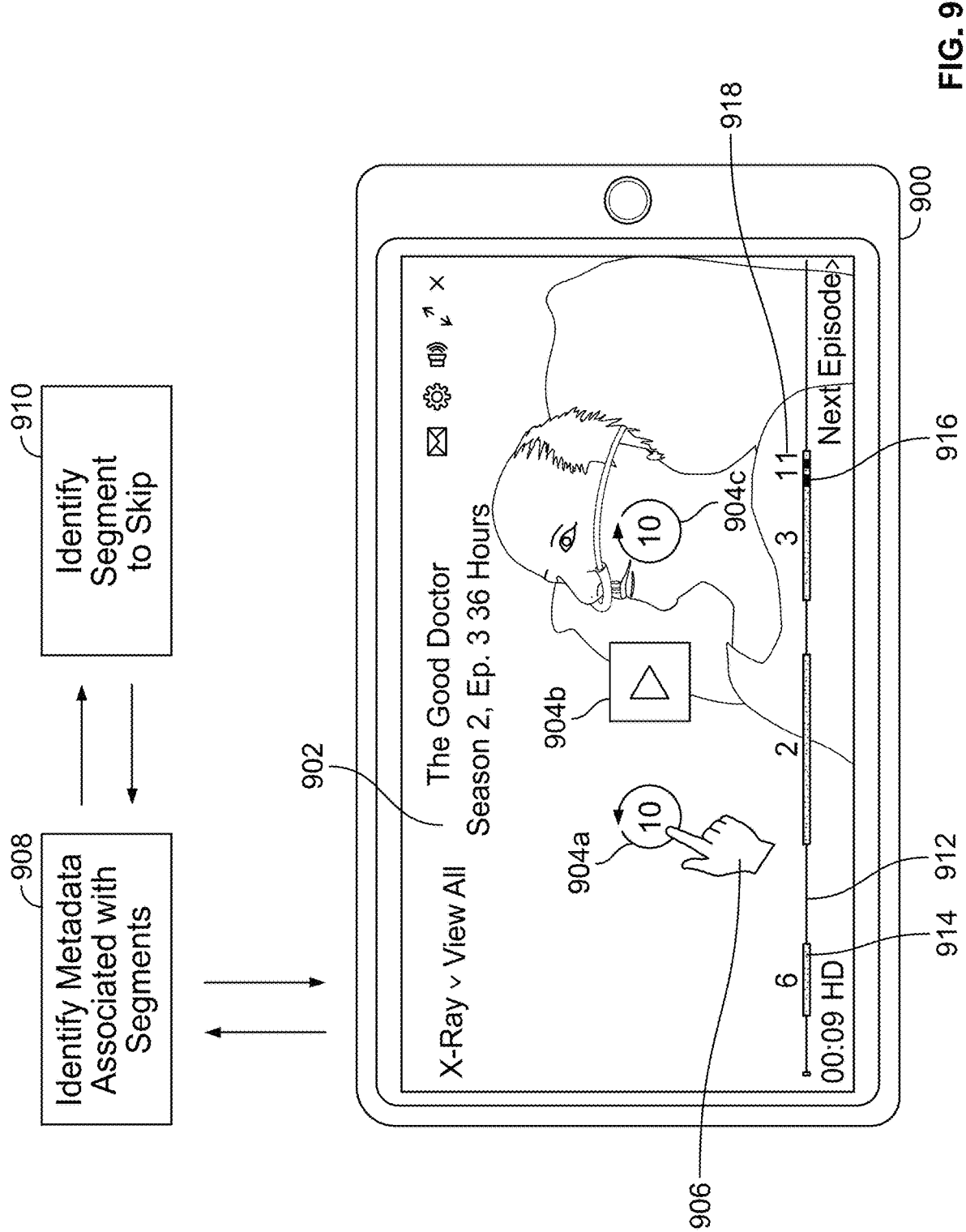
Figure 11:
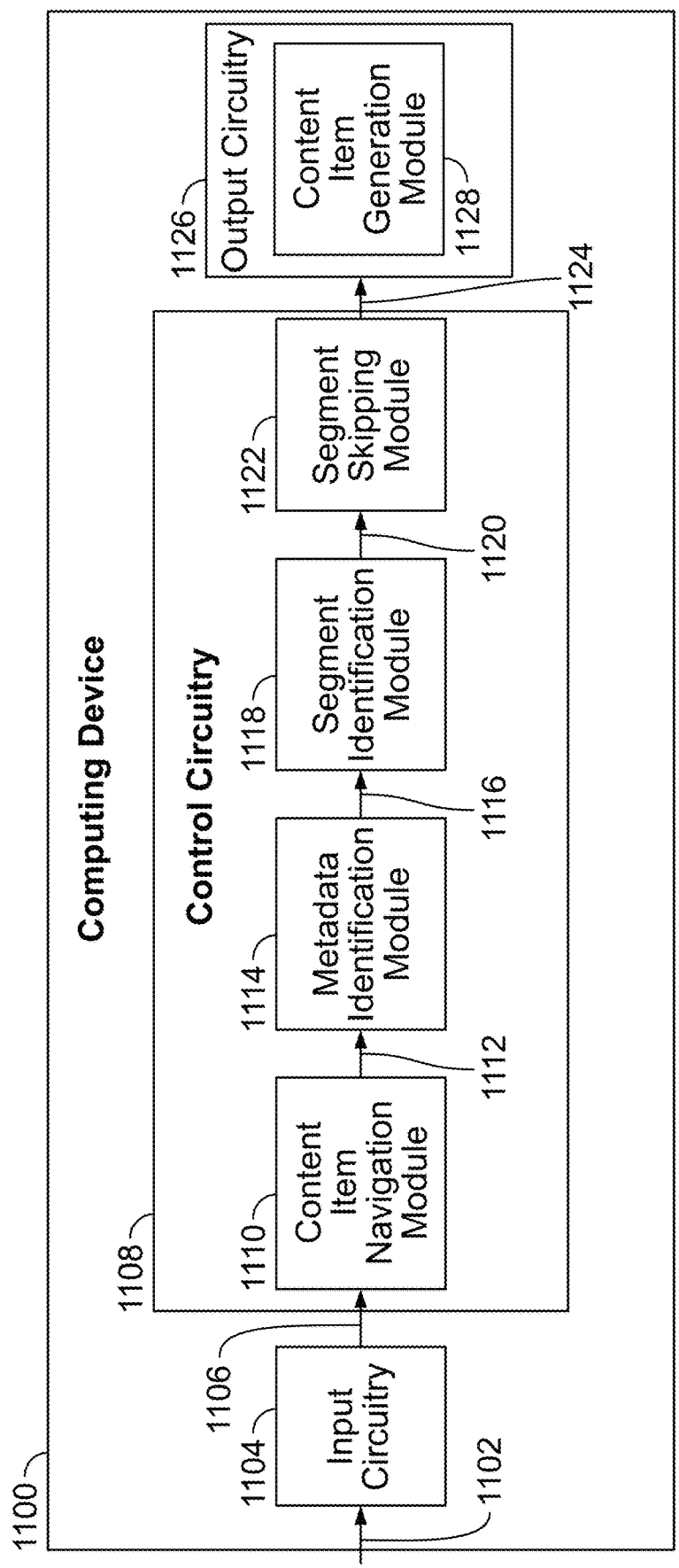
Figure 12:
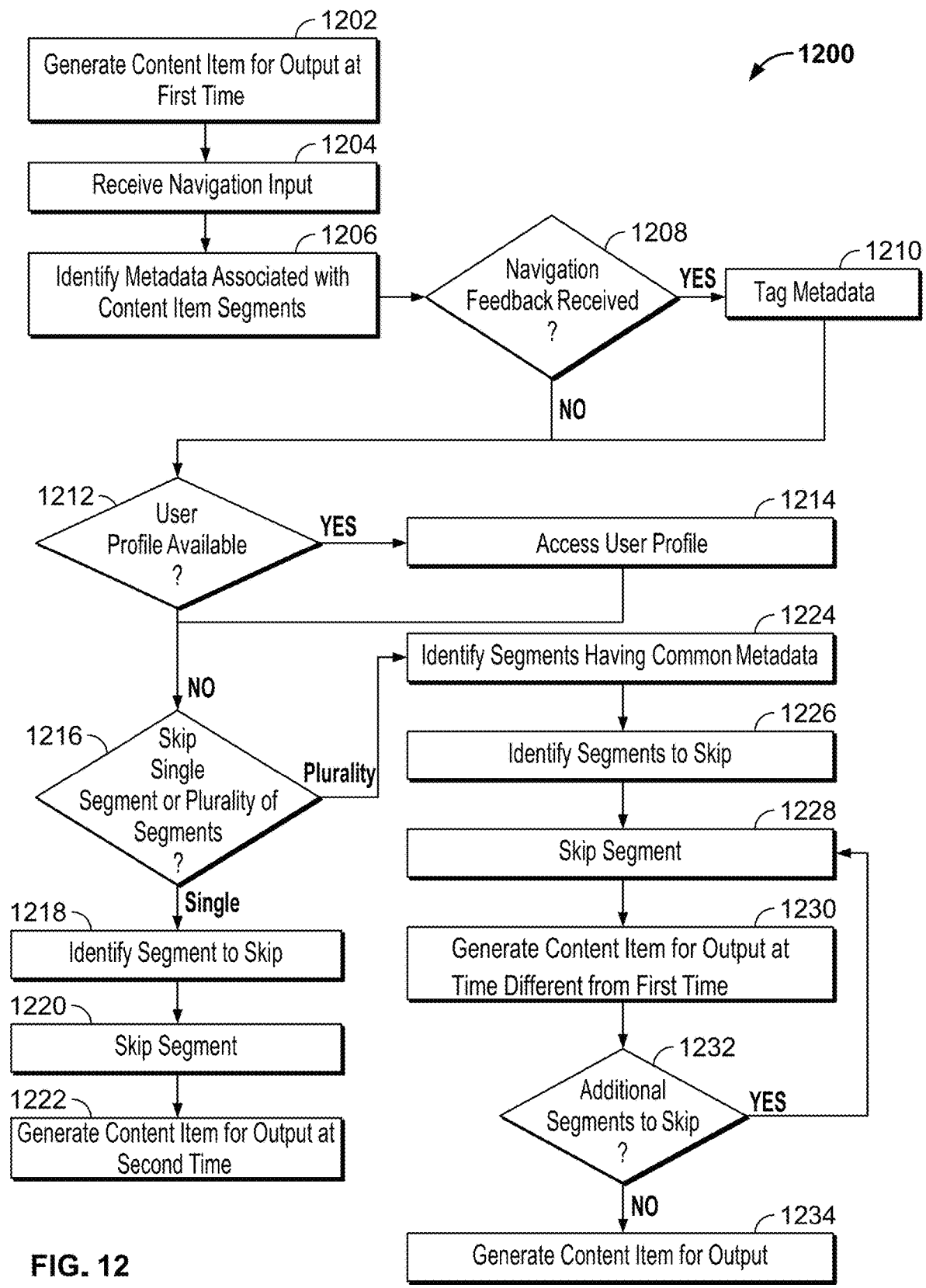

FIG. 9 an example environment in which a smart segmented progress bar is generated for output, in accordance with some embodiments of the disclosure;

FIG. 10 shows an exemplary data structure indicating a play state and metadata associated with segments of a content item, in accordance with some embodiments of the disclosure;

FIG. 11 shows a block diagram representing components of a computing device and dataflow therebetween for enabling a smart automatic skip mode during the playback of a content item; and FIG. 12 shows a flowchart of illustrative steps involved in enabling a smart automatic skip mode during the playback of a content item.

DETAILED DESCRIPTION

Systems and methods are described herein for enabling a smart automatic skip mode during the playback of a content item. A content item includes audio, video, text and/or any other media content. A content item may be a single media content item. In other examples, it may be a series (or season) of episodes of media content items. Audio includes audio-only content, such as podcasts. Video includes audio-visual content such as movies and/or television programs. Text includes text-only content, such as event descriptions. One example of a suitable media content item is one that complies with the MPEG DASH standard. An OTT, streaming and/or VOD service (or platform) may be accessed via a website and/or an app running on a computing device, and the device may receive any type of content item, including live content items and/or on-demand content items. Content items may, for example, be streamed to physical computing devices. In another example, content items may, for example, be streamed to virtual computing devices in, for example, an augmented environment, a virtual environment and/or the metaverse.

Receiving input includes receiving any input related to a computing device. Input may be received via an infrared controller, Bluetooth and/or Wi-Fi controller of the computing device, a touchscreen, a keyboard, a mouse and/or a microphone. In another example, the input may comprise instructions received via another computing device.

A segment is any part of a content item. It may, for example, comprise a single frame, or a plurality of frames. A segment may comprise a minority portion or a majority portion of a content item. In other examples, a segment may comprise a segment that starts with an i-frame and/or instantaneous decoder refresh (IDR) frame of the content item and ends with the frame preceding a subsequent i-frame and/or IDR frame. A segment may also comprise a segment that is defined by a data structure and/or file external to the content item, for example, a video chunk defined in a manifest file.

Metadata is any data that describes a portion of a content item. Metadata may be pre-generated and accessible via a content item; in other examples, metadata may be generated via frames, audio, closed captions and/or any other data associated with the content item. A trained machine learning model may, for example, be utilized to identify elements in the content item based on frames, audio, closed captions, text and/or any other data associated with the content item. Elements include any objects and/or people that may be present in a frame of a content item.

Skipping a segment of a content item may comprise performing a navigation operation, such as fast-forwarding and/or rewinding a part of the content item. Navigation operations, such as skipping by a fixed number of seconds, for example five seconds, may also be utilized. Skipping a segment may comprise displaying only a subset of available frames of a content item for display during the skipping operation; in other examples, skipping a segment may comprise displaying no frames during the skipping operation.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
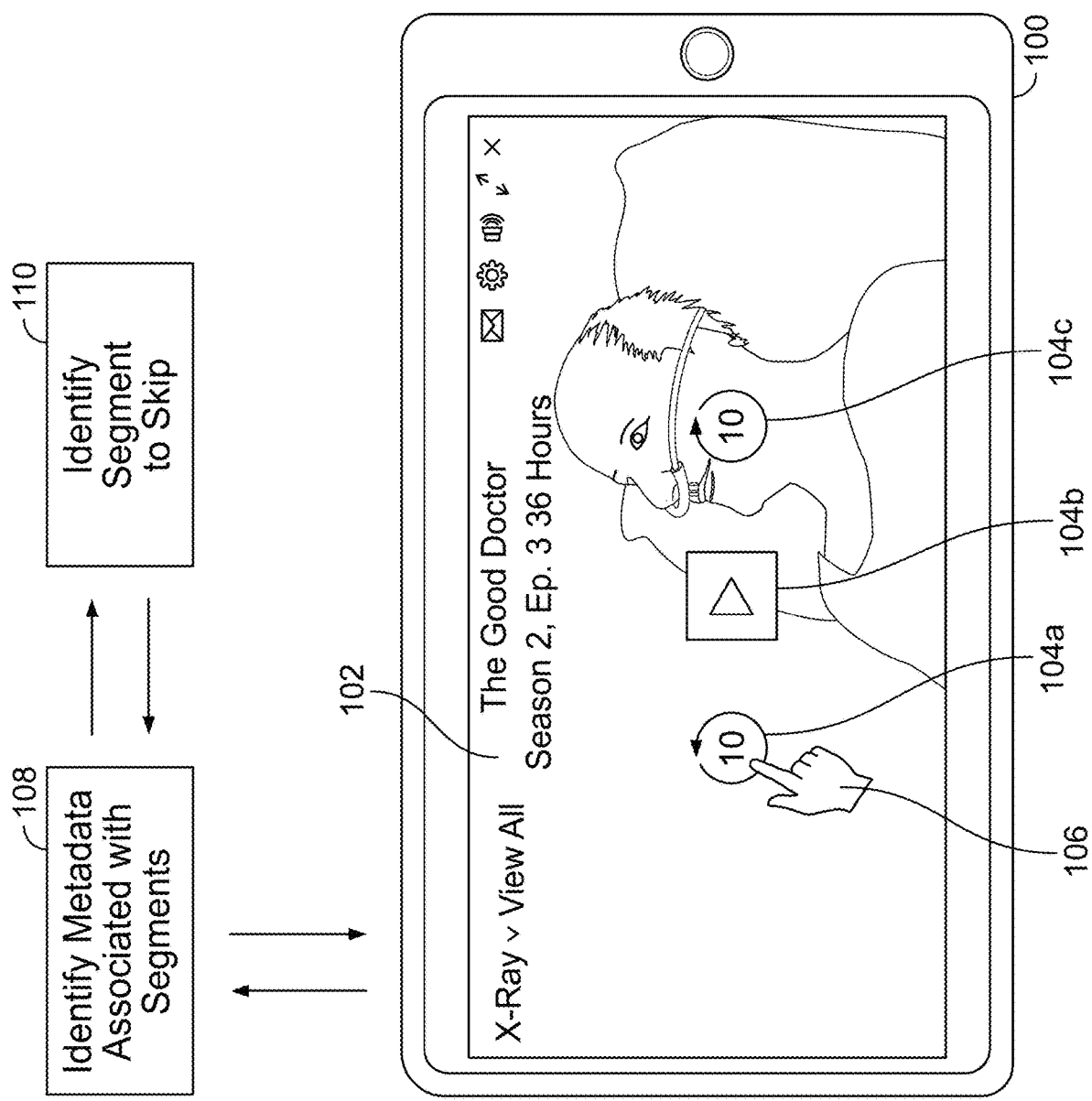
FIG. 1 shows an example environment in which a smart automatic skip mode is enabled during the playback of a content item, in accordance with some embodiments of the disclosure.

FIG. 1 shows an example environment in which a smart automatic skip mode is enabled during the playback of a content item, in accordance with some embodiments of the disclosure. The environment comprises tablet 100, though in other examples, the tablet may be any suitable computing device including, for example, a smart television, smartphone, and/or a laptop. A content item 102 is accessed via, for example, a media player running on the tablet 100. In some examples, the media player may be part of an application associated with an OTT provider. The media player comprises navigation controls such as, for example, skip backward 10 seconds 104a, play/pause 104b and skip forward 10 seconds 104c. Any other navigation controls are contemplated, such as fast-forward, rewind and different skip time periods such as, for example five or 15 seconds. On receiving an input 106 associated with a navigation control 104a, 104b, 104c, the media player navigates to an appropriate point in the content item 102. If, for example, an input 106 is received with a skip forward 10 seconds 104c navigation control, then the media player will skip forward in the content item 102 by 10 seconds 104c. Input may comprise any suitable input including, for example, a touch event on a touchscreen of the tablet 100. In some examples, user behavior data (i.e., with respect to navigation commands) may be collected over a threshold period of time, for a threshold number of navigation commands and/or in accordance with observed viewing patterns.

Metadata associated with segments of the content item 102 is identified 108. For example, metadata associated with all of the segments, or a majority of segments, of the content item 102 may be identified. In other examples, metadata associated with the segments of the content item 102 that are skipped may be identified. The metadata may be pre-generated and may be accessed via the content item 102. In other examples, the metadata may be generated in response to a request for generating the metadata. A segment to skip is identified 110 based on the input and the metadata. In an example, a navigation command to fast-forward through segments of a content item that comprise a particular actress, such as Nicole Kidman, may be received over a period of time; for example, five fast-forward commands associated with Nicole Kidman may be received within a 10-minute period. In this example, it may be identified that future segments of the content item comprising Nicole Kidman are to be skipped. In another example, a navigation command to skip segments of a content item that comprise a hospital bed may be received over a period of time. In a similar manner, it may be identified that future segments of the content item comprising a hospital bed are to be skipped. In some examples, the skipping of segments may be applied to a current movie and/or episode of a series. In other examples, the skipping of segments may be stored as a preference, optionally via a user profile, and may be applied to other movies and/or episodes of a series. An OTT application may keep track of navigation commands and the metadata associated with the segments of the content item to which a navigation command applies, for example. Analysis may be performed on the data to identify a correlation between issued navigation commands and metadata associated with the segments of the content item to which a navigation command applies. In some examples, the analysis may comprise identifying that a number of navigation commands associated with a type of segment are received over a threshold period of time, for example three navigation commands within a 15-minute period.

As playback of the content item 102 progresses, when a segment to skip is encountered, that segment is skipped, and the content item 102 is continued to be displayed at the tablet 100. Skipping the segment of the content item 102 may comprise performing a navigation operation, such as fast-forwarding and/or rewinding a part of the content item. Navigation operations, such as skipping by a fixed number of seconds, for example five seconds, may also be utilized. Skipping a segment may comprise displaying only a subset of available frames of the content item 100 for display; in other examples, skipping a segment may comprise displaying no frames during the skipping operation. In this manner, segments that are associated with content that a user usually skips are automatically skipped, obviating the need for the user to manually skip those segments. Such a system avoids the frustration, and wasted bandwidth and processing resources, associated with a user skipping ahead too far, or not far enough.

The method described in connection with FIG. 1 enables a media player to automatically skip segments of a content item that is being generated for output. In some examples, the identified segments to skip may be in connection with subsequent content items, for example in the case of a series of episodes. In other examples, the identified segments to skip may be in connection with related content items, for example, movies featuring common actors and/or actresses. In some examples, the methods described herein may be implemented via an application programming interface (API) that is utilized by a media player. In one example, an API may be utilized to flag identified segments of a content item to a media player so that they are not requested or are omitted from a personalized manifest file. Segments may be omitted from a personalized manifest file by, for example, not including the uniform resource indicator (URI) of such segments in the manifest file or restricting or blocking byte range requests that correspond to such segments.

Figure 2:
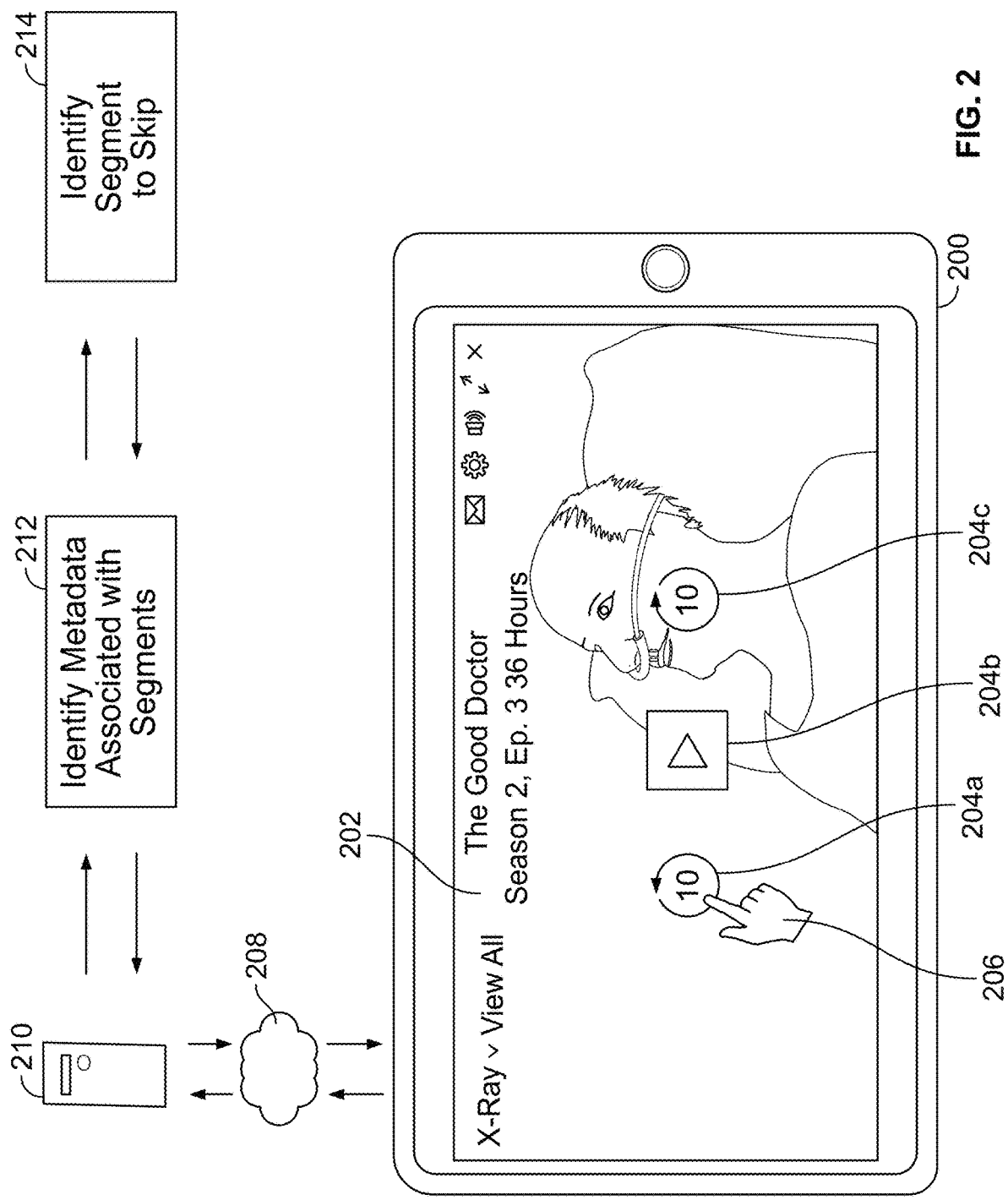
FIG. 2 shows another example environment in which a smart automatic skip mode is enabled during the playback of a content item, in accordance with some embodiments of the disclosure.

FIG. 2 shows another example environment in which a smart automatic skip mode is enabled during the playback of a content item, in accordance with some embodiments of the disclosure. In a similar manner to the environment discussed in connection with FIG. 1, the environment comprises a tablet 200. In addition, the environment comprises server 210. A content item 202 is accessed via, for example, a media player running on the tablet 200. The media player comprises navigation controls such as, for example, skip backward 10 seconds 204a, play/pause 204b and skip forward 10 seconds 204c. On receiving an input 206 associated with a navigation control 204a, 204b, 204c, the media player navigates to an appropriate point in the content item 202. Data relating to the input is transmitted via network 208, such as the internet, to a server 210. The network 208 may comprise wired and/or wireless means. In a similar manner to that discussed in connection with FIG. 1, at the server 210, metadata associated with segments of the content item 202 is identified 212, and a segment to skip is identified 214 based on the input and the metadata. An indication of the segment to skip is transmitted, via network 208, to tablet 200. As playback of the content item 202 progresses, when a segment to skip is encountered, that segment is skipped, and the content item 202 is continued to be displayed at the tablet 200. The server 210 may comprise a single physical or virtual server. In other examples, the process associated with metadata identification 212 and identifying 214 a segment to skip may take place on different physical or virtual servers. In some examples, any content item accessed may be transmitted from the same server 210 that is used to perform any of the aforementioned processes 212, 214. In other examples, the content item may be transmitted from a different server to a server that is used to perform any of the aforementioned processes 212, 214. In some examples, only one of the processes 212, 214 may take place at the server 210, and the other process may take place at the tablet 200.

Figure 3:
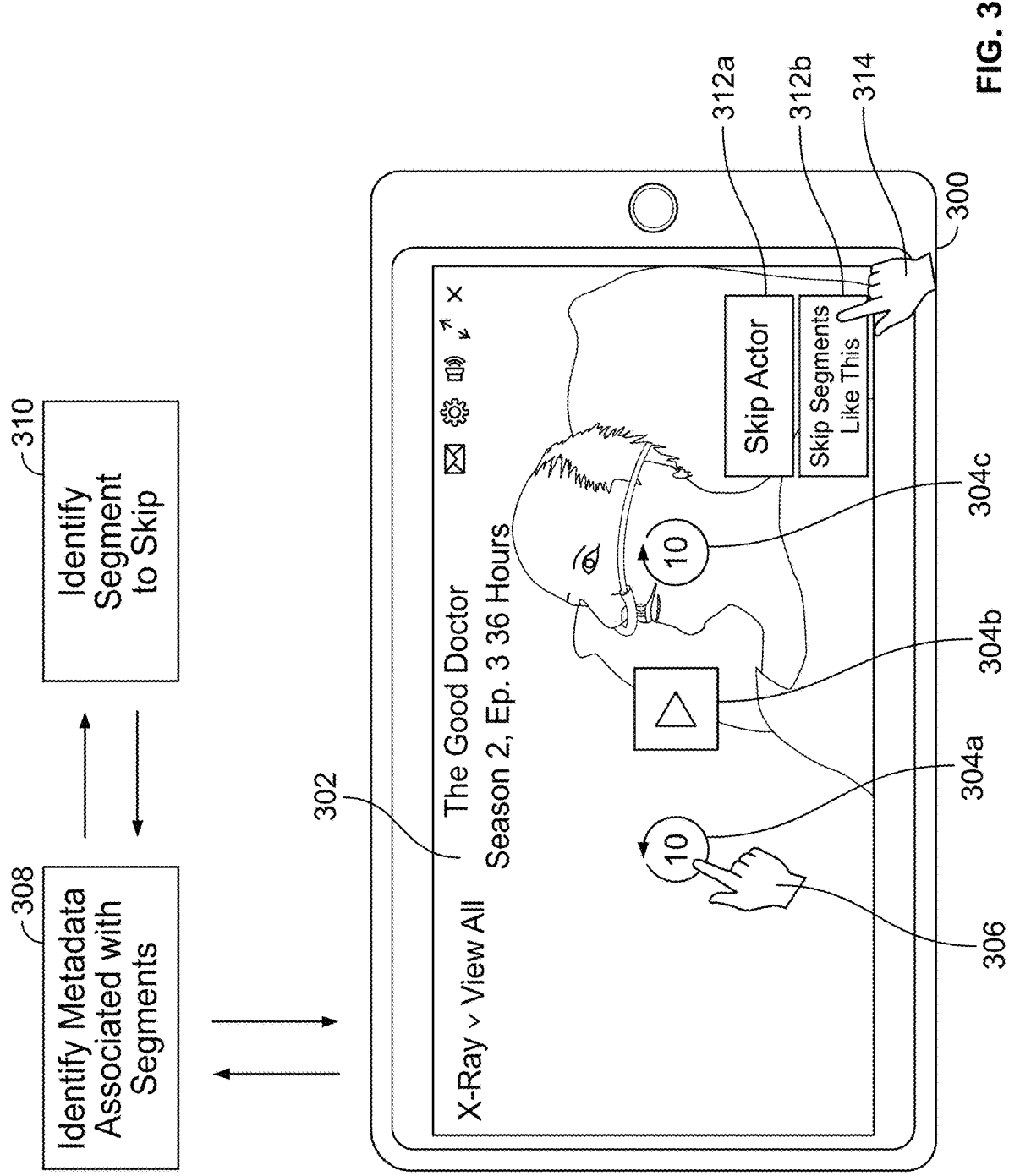
FIG. 3 shows another example environment in which a smart automatic skip mode is enabled during the playback of a content item, in accordance with some embodiments of the disclosure.

FIG. 3 shows another example environment in which a smart automatic skip mode is enabled during the playback of a content item, in accordance with some embodiments of the disclosure. In a similar manner to the environment discussed in connection with FIGS. 1 and 2, the environment comprises a tablet 300 at which a content item 302 is accessed via, for example, a media player running on the tablet 300. The media player comprises navigation controls such as, for example, skip backward 10 seconds 304a, play/pause 304b and skip forward 10 seconds 304c. On receiving an input 306 associated with a navigation control 304a, 304b, 304c, the media player navigates to an appropriate point in the content item 302. Metadata associated with segments of the content item 302 is identified 308, and a segment to skip is identified 310 based on the input and the metadata. As playback of the content item 302 progresses, when, or before, a segment to skip is encountered, an icon 312a, 312b is displayed via a display of the tablet 300. The icon 312a, 312b may comprise text that indicates the action that will be performed in response to receiving input associated with the icon. For example, icon 312a enables a user to automatically skip segments of a content item comprising the currently displayed actor. In another example, icon 312b enables a user to automatically skip segments of a content item that are like the segment currently being displayed at the tablet 300. In some examples, the icons 312a, 312b, for example, the text associated with the icons, are dynamically generated in response to the identified metadata. On receipt of an input 314 associated with the icon 312b, the relevant segment, or segments, is skipped and the content item 302 is continued to be displayed at the tablet 300. Any of the elements of the process associated with identifying 308 metadata associated with the segments and/or identifying 310 a segment to skip may take place at the tablet 300 and/or at a server, as discussed in connection with FIG. 2 above.

Figure 4:
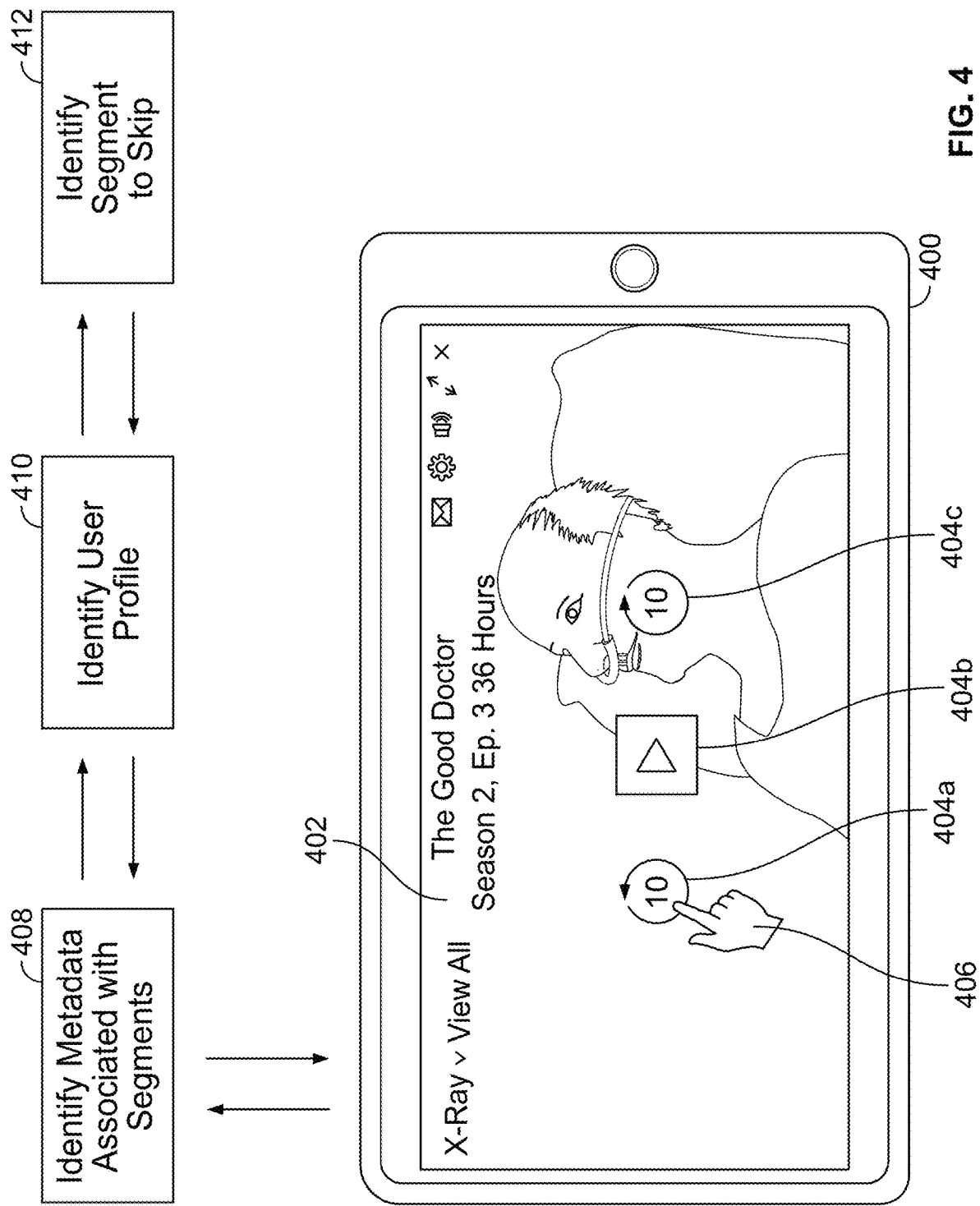
FIG. 4 shows another example environment in which a smart automatic skip mode is enabled during the playback of a content item, in accordance with some embodiments of the disclosure.

FIG. 4 shows another example environment in which a smart automatic skip mode is enabled during the playback of a content item, in accordance with some embodiments of the disclosure. In a similar manner to the environment discussed in connection with FIGS. 1-3, the environment comprises a tablet 400 at which a content item 402 is accessed via, for example, a media player running on the tablet 400. The media player comprises navigation controls such as, for example, skip backward 10 seconds 404a, play/pause 404b and skip forward 10 seconds 404c. On receiving an input 406 associated with a navigation control 404a, 404b, 404c, the media player navigates to an appropriate point in the content item 402. Metadata associated with segments of the content item 402 is identified 408, and a user profile is identified 410. A segment to skip is identified 412 based on the input, the metadata, and the user profile. For example, a user profile may indicate that a user has previously skipped scenes of a content item comprising a particular actor. As such, scenes comprising the same actor may be skipped in response to, for example, a first, or second, navigation event associated with a segment of a content item comprising the same actor. In another example, the user profile may comprise a pre-set preference to skip segments of content items comprising a particular actor and/or of a particular type. As playback of the content item 402 progresses, when a segment to skip is encountered, that segment is skipped, and the content item 402 is continued to be displayed at the tablet 400. Any of the elements of the process associated with identifying 408 metadata associated with the segments, identifying 410 a user profile, and/or identifying 412 a segment to skip may take place at the tablet 400 and/or at a server, as discussed in connection with FIG. 2 above.

Figure 5:
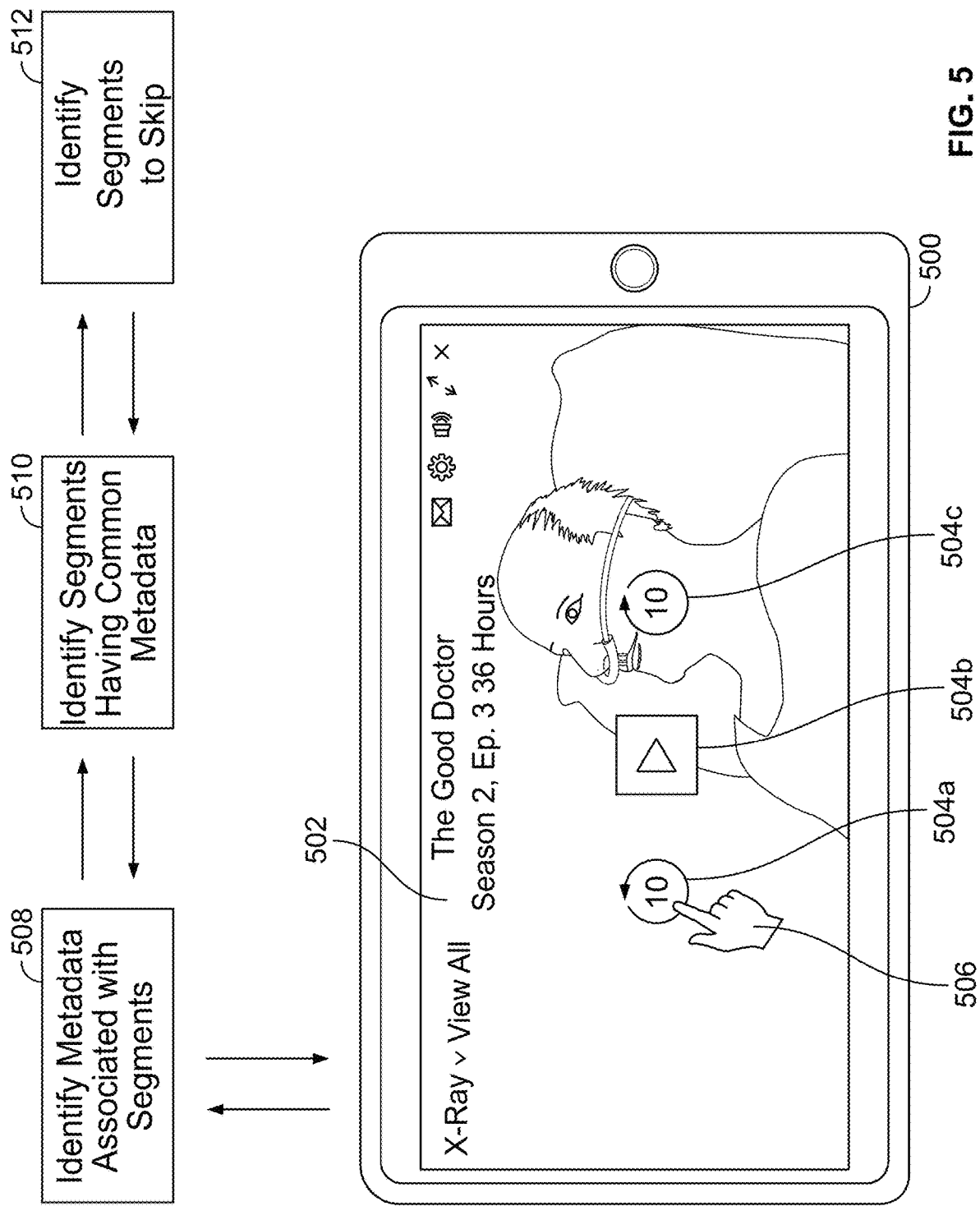
FIG. 5 shows another example environment in which a smart automatic skip mode is enabled during the playback of a content item, in accordance with some embodiments of the disclosure.

FIG. 5 shows another example environment in which a smart automatic skip mode is enabled during the playback of a content item, in accordance with some embodiments of the disclosure. In a similar manner to the environment discussed in connection with FIGS. 1-4, the environment comprises a tablet 500 at which a content item 502 is accessed via, for example, a media player running on the tablet 500. The media player comprises navigation controls such as, for example, skip backward 10 seconds 504a, play/pause 504b and skip forward 10 seconds 504c. On receiving an input 506 associated with a navigation control 504a, 504b, 504c, the media player navigates to an appropriate point in the content item 502. Metadata associated with segments of the content item 502 is identified 508, and segments having common metadata are identified 510. For example, the segments of a content item comprising different actors are identified. In another example, the segments of a content item relating to a particular scene are identified, for example a hospital. In some examples, common metadata may be metadata that matches exactly, for example, segments that comprise the same actor. In other examples, common metadata may be metadata that is common within a certain confidence level. For example, a recovering alcoholic may skip scenes that show a bottle of alcohol. In this example, the metadata may indicate that a scene shows a bottle of beer and in another scene, a bottle of wine. These two scenes may be identified as having common metadata, as they both show bottles of alcohol. In another example, confidence levels may be associated with objects identified in segments of the content item. The segments may be identified as having common metadata if, for example, the confidence level for common items is above a threshold level, for example 95%. A plurality of segments to skip are identified 512 based on the input, the metadata, and the segments that have common metadata. As playback of the content item 502 progresses, when a segment to skip is encountered, that segment is skipped, and the content item 502 is continued to be displayed at the tablet 500. Any of the elements of the process associated with identifying 508 metadata associated with the segments, identifying 510 segments having common metadata, and/or identifying 512 segments to skip may take place at the tablet 500 and/or at a server, as discussed in connection with FIG. 2 above.

Figure 6:
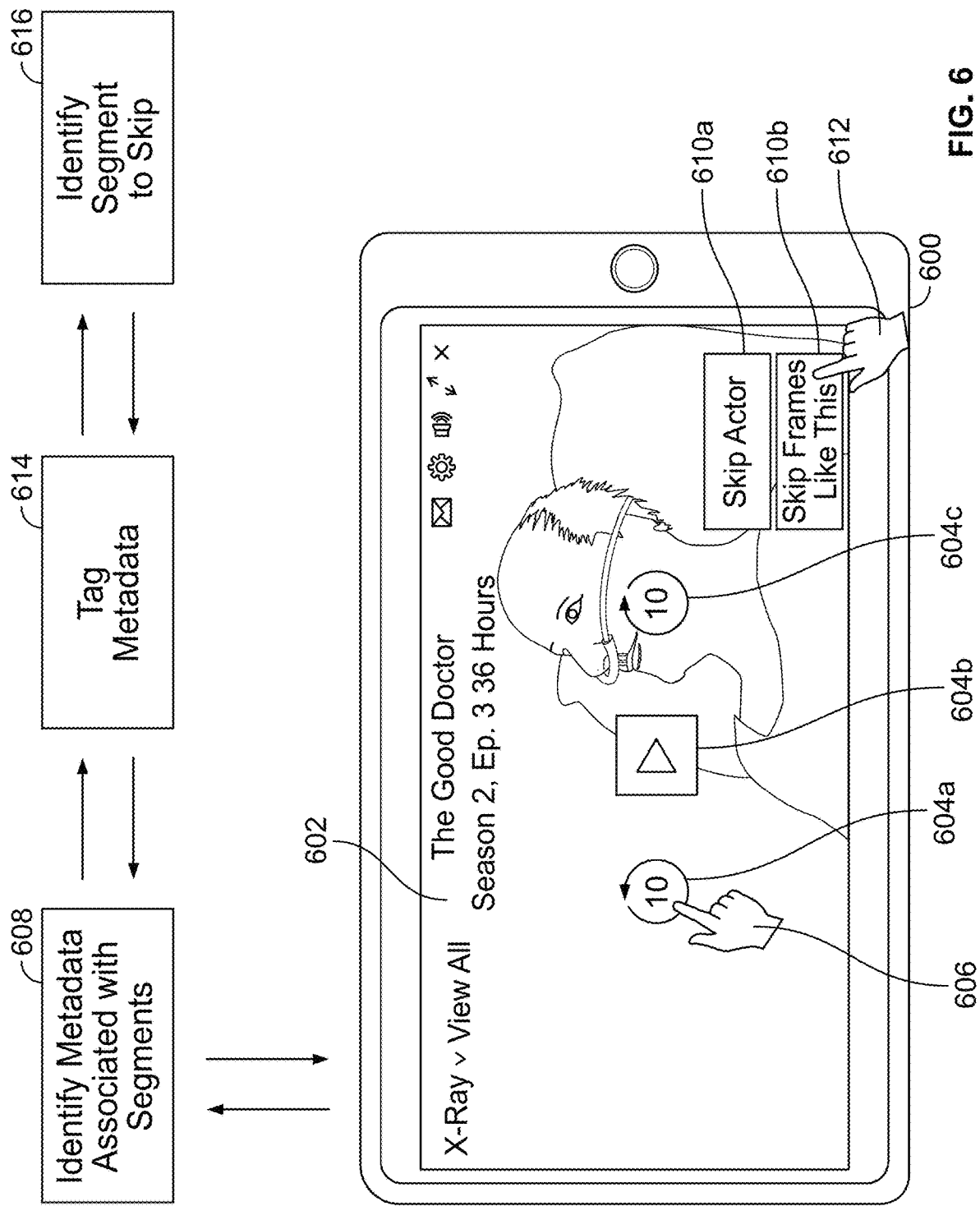
FIG. 6 shows another example environment in which a smart automatic skip mode is enabled during the playback of a content item, in accordance with some embodiments of the disclosure.

FIG. 6 shows another example environment in which a smart automatic skip mode is enabled during the playback of a content item, in accordance with some embodiments of the disclosure. In a similar manner to the environment discussed in connection with FIGS. 1-5, the environment comprises a tablet 600 at which a content item 602 is accessed via, for example, a media player running on the tablet 600. The media player comprises navigation controls such as, for example, skip backward 10 seconds 604a, play/pause 604b and skip forward 10 seconds 604c. On receiving an input 606 associated with a navigation control 604a, 604b, 604c, the media player navigates to an appropriate point in the content item 602. Metadata associated with segments of the content item 602 is identified 608. In response to receiving a navigation command, a request for feedback is displayed on a display of the tablet 600. This request takes form of selectable icons 610a, 610b. The icons display text, based on the identified metadata, to obtain feedback with respect to the navigation command. For example, if the user skipped forward 10 seconds, and the metadata indicates that the segment comprises a particular actor and the scene is of a particular type, two icons may be displayed to the user. A first icon 610a may comprise the text "Skip Actor," and a second icon 610b may comprise the text "Skip Frames Like This." The text of the icons 610a, 610b may morph as the user progresses through the content item, and the icons 610a, 610b may by dynamically generated. A user provides input 612 by selecting an appropriate icon. In some examples, the request for feedback may be output via speakers of the tablet 600, and any response may be received via a microphone of the tablet 600. The identified metadata is tagged 614 in accordance with the feedback that is provided via icons 610a, 610b. A segment to skip is identified 616 based on the input and the tagged metadata. As playback of the content item 602 progresses, when a segment to skip is encountered, that segment is skipped, and the content item 602 is continued to be displayed at the tablet 600. Any of the elements of the process associated with identifying 608 metadata associated with the segments, tagging 614 metadata, and/or identifying 616 a segment to skip may take place at the tablet 600 and/or at a server, as discussed in connection with FIG. 2 above.

In some examples, the feedback may be collected and applied to a content item that is currently being displayed at the tablet 600. In other examples, the feedback may be applied to all content items associated with a user profile or, for example, a subset of related content items, such a series of episodes.

In some examples, display of the selectable icons (e.g., the "Skip Actor" and "Skip Frames Like This" icons 610a, 610b) may be based on a condition. Such a condition may be based on digital rights management (DRM) parameters and/or any other content restrictions. For example, reality TV shows might allow users to skip a personality and/or skip through some segments, but not all segment. In another example, a particular content item may have DRM restrictions preventing such a feature from being offered, and therefore the selectable icons may not be displayed. Restrictions, for example DRM restrictions, can be signaled via, for example, a manifest file enabling to the player logic used to construct the navigation pane or section.

Figure 7:
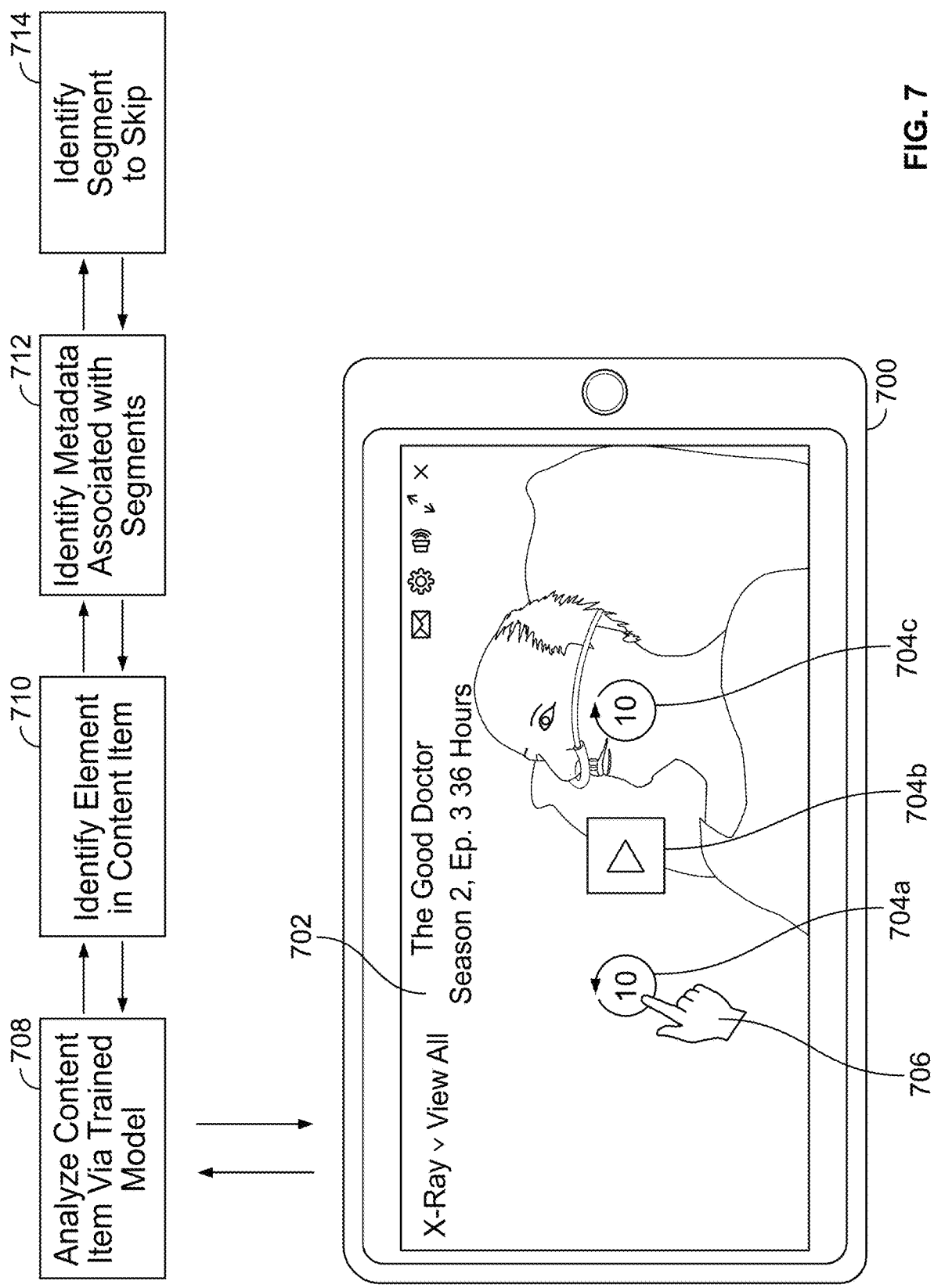
FIG. 7 shows another example environment in which a smart automatic skip mode is enabled during the playback of a content item, in accordance with some embodiments of the disclosure.

FIG. 7 shows another example environment in which a smart automatic skip mode is enabled during the playback of a content item, in accordance with some embodiments of the disclosure. In a similar manner to the environment discussed in connection with FIGS. 1-6, the environment comprises a tablet 700 at which a content item 702 is accessed via, for example, a media player running on the tablet 700. The media player comprises navigation controls such as, for example, skip backward 10 seconds 704a, play/pause 704b and skip forward 10 seconds 704c. On receiving an input 706 associated with a navigation control 704a, 704b, 704c, the media player navigates to an appropriate point in the content item 702. The content item is analyzed 708 via a trained model. For example, a frame of the content item is analyzed via a trained machine learning model. The machine learning model may be trained to identify anything in the content item that may be of relevance. For example, the machine learning model may be trained to identify general objects in a content item, types of scene, locations and/or particular actors. On analyzing the content item, elements in, for example, a frame of the content item may be identified 710. For example, the elements may comprise objects, a type of scene, a location and/or a particular actor. Metadata associated with segments of the content item 702 is identified 712 based on the identified elements. A segment to skip is identified 714 based on the input and the metadata. As playback of the content item 702 progresses, when a segment to skip is encountered, that segment is skipped, and the content item 702 is continued to be displayed at the tablet 700. Any of the elements of the process associated with analyzing 708 the content item, identifying 710 an element in the content item, identifying 712 metadata associated with the segments and/or identifying 714 a segment to skip may take place at the tablet 700 and/or at a server, as discussed in connection with FIG. 2 above.

If a user provides feedback, as discussed in connection with FIG. 6 above, to "Skip Frames Like This" the feedback indicates that the user desires to skip frames that depict similar content, such as a man in a hospital. In order to enable such behavior, a backend service may analyze the content item, using known video artificial intelligence (AI) services that can recognize, for example, objects, places, and actions in a content item to extract (or identify) metadata at, for example, the frame level. Additionally, the backend service can utilize trained machine learning models that are trained to recognize, for example, actors and/or actresses via, for example, the recognition of faces in the frame of a content item. The output of any analysis may be utilized to identify metadata for skipping segments of a content item that is being generated for output or, in some examples, for related content items, such as episodes in a series of content items. In some examples, the identified metadata can then be utilized by a manifest file personalization and/or generation service to generate a custom manifest file that does not include URIs to undesired segments of a content item (e.g., actors, images that depict a previously disliked context and/or action). Such a manifest file personalization and/or generation service may be implemented in accordance with the method described in connection with FIG. 8 below.

Figure 8:
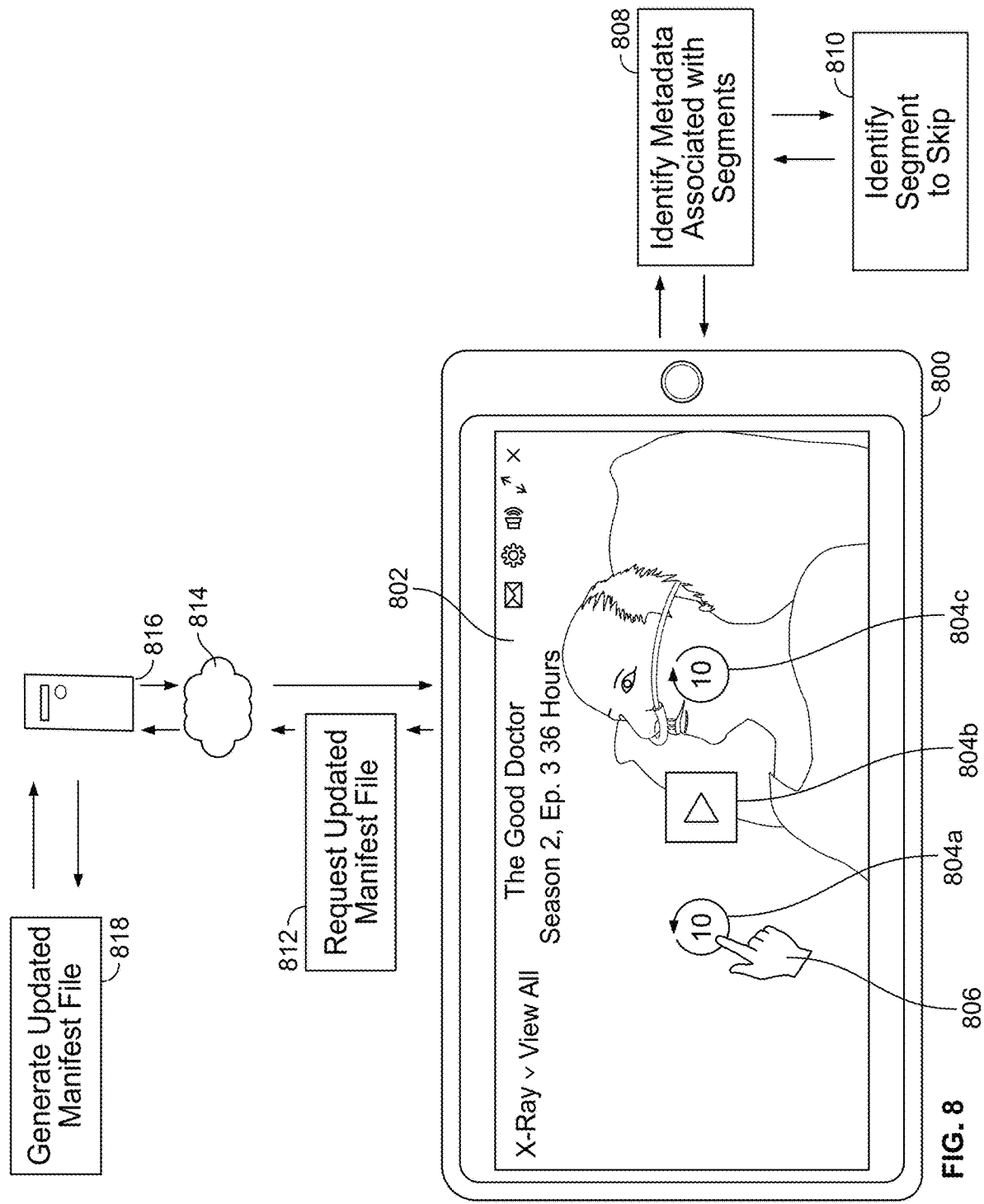
FIG. 8 shows another example environment in which a smart automatic skip mode is enabled during the playback of a content item, in accordance with some embodiments of the disclosure.

FIG. 8 shows another example environment in which a smart automatic skip mode is enabled during the playback of a content item, in accordance with some embodiments of the disclosure. In a similar manner to the environment discussed in connection with FIGS. 1-7, the environment comprises a tablet 800 at which a content item 802 is accessed via, for example, a media player running on the tablet 800. In addition, the environment comprises server 816. The media player comprises navigation controls such as, for example, skip backward 10 seconds 804a, play/pause 804b and skip forward 10 seconds 804c. On receiving an input 806 associated with a navigation control 804a, 804b, 804c, the media player navigates to an appropriate point in the content item 802. Metadata associated with segments of the content item 802 is identified 808, and a segment to skip is identified 810 based on the input and the metadata. In order to skip the identified segments, an updated manifest file is requested 812. A request is transmitted via network 814 to server 816, where an updated manifest file is generated 818 and is transmitted, via network 814, to tablet 800. The media player running on the tablet utilizes the updated manifest file to request only those segments that are to be played back at the tablet 800. As playback of the content item 802 progresses, when a segment to skip is encountered, that segment is skipped, and the content item 802 is continued to be displayed at the tablet 800. Any of the elements of the process associated with identifying 808 metadata associated with the segments and/or identifying 810 a segment to skip may take place at the tablet 800 and/or at a server, as discussed in connection with FIG. 2 above. In some examples, the server may be the same server 816 where the updated manifest file is generated 818.

A generated manifest file can also be utilized by a media player that is already generating a content item for output. This may, however, require that the media player receives an updated manifest file if a, for example, backend service is able to determine which segments of the remaining content of a content item are to be skipped. A data structure, such as the data structure described in connection with FIG. 10 below, can be utilized to reconstruct (or generate) a manifest file and transmit it to the media player. The data structure may comprise metadata about the content item, such as frame metadata, shot metadata and/or scene specific metadata that was previously generated using, for example, the trained machine learning algorithm described above, in connection with FIG. 7, or any similar tools. For example, the media player can receive information from the backend service and, if necessary, forcibly trigger the playing of an advertisement, or advertisements, to force the player to utilize the updated manifest file in a subsequent request (e.g., after the advertisement, or advertisements, has finished playing). The backend service may transmit an indication to the media player not to request any segments after it has downloaded the advertisement for processing and rendering. On receiving an updated manifest file, the original manifest file may be rendered obsolete by the media player.

In some examples, the manifest file may be updated by removing one or more references to segments (URIs) from the manifest file. The removal of the URIs from the manifest file may depend on the amount of content in the content item that would be removed. For example, if it is identified that a user is consistently skipping scenes comprising a particular actor in a series of episodes, then segments relating to that actor may be automatically skipped in the current, and future, episodes. However, if the amount of undesired content relating to the actor is minimal (e.g., the undesired actor only appears in a short segment of an episode, or episodes), then the generation of a new manifest file to remove the URIs for a small segment of a content item may not be computationally efficient. To address this issue, and to prevent wastage of processing resources, a media player may be instructed to skip an identified segment, for example, by adding a "skip" tag to the manifest file as a signaling mechanism. In some examples, it may be determined if the media player supports the use of a "skip" tag, before such a tag is added to the manifest file. In some examples, another signaling mechanism such as transmitting, to the media player, an addendum related to the manifest file may be used. The addendum may contain segment numbers of byte ranges that should not be requested. The addendum may be a data structure that can also be accessed by the media player to logically determine what segments should not be requested or it should not issue an HTTP GET request for.

FIG. 9 shows another example environment in which a smart automatic skip mode is enabled during the playback of a content item, in accordance with some embodiments of the disclosure. In a similar manner to the environment discussed in connection with FIGS. 1-8, the environment comprises a tablet 900 at which a content item 902 is accessed via, for example, a media player running on the tablet 900. The media player comprises navigation controls such as, for example, skip backward 10 seconds 904a, play/pause 904b and skip forward 10 seconds 904c. On receiving an input 906 associated with a navigation control 904a, 904b, 904c, the media player navigates to an appropriate point in the content item 902. Optionally, metadata associated with segments of the content item 902 is identified 908, and, optionally, a segment to skip is identified 910 based on the input, and the user profile. Optionally, as playback of the content item 902 progresses, when a segment to skip is encountered, that segment is skipped, and the content item 902 is continued to be displayed at the tablet 900.

A progress bar associated with the content item 902 is displayed at a display of the tablet 900. The progress bar comprises portions 912 that are associated with segments of the content item that have not been consumed, for example that were skipped (including automatically skipped segments of a content item, as described herein), are yet to be consumed, or are generally not associated with a play state. In addition, the progress bar comprises portions 914 that are associated with segments of the content item that have been consumed. In some variations, the progress bar may comprise a third variation of portions 916 that are associated with a specific navigation operation, for example, in response to receiving input associated with the skip forward 10 seconds user interface element. The portions 912, 914, 916 may be differentiated from one another via, for example, different colors and/or thicknesses. A further, optional, variation comprises an indicator 918 of how many times a segment of a content item has been consumed. In some examples, this indicator may comprise a number indicating how many times the segment has been consumed. In other examples, a color associated with a portion of the progress bar may be varied in intensity in response to how many times the associated segment has been consumed.

In some examples, the portions 912 that are associated with segments of the content item that have not been consumed may be selectable. On receiving user input associated with a portion 912, the associated segment of the content item may be generated for output. Such an arrangement enables a user to, for example, easily navigate to, and watch, previously unwatched segments of a content item. Any of the elements of the process associated with identifying 908 metadata associated with the segments and/or identifying 910 a segment to skip may take place at the tablet 900 and/or at a server, as discussed in connection with FIG. 2 above.

In some examples, an API may be utilized to add color and/or thickness to a progress bar in programmatical manner. For example, in the Android operating system, the following API may be used to change the color of a seekbar:
    seekbar.setProgressTintList(ColorStateList.valueOf(Color.RED))
The above API adds the color red to the seekbar. An appropriate color can be used to change the color of the seekbar as and when needed.

FIG. 10 shows an exemplary data structure indicating a play state and metadata associated with segments of a content item, in accordance with some embodiments of the disclosure. The data structure 1000 comprises a table that indicates 1002 a segment identifier of a content item. In some examples, the identifier may comprise a start time of a segment of a content item. Data is associated with each identified segment. In this example, the data comprises a play state 1004 indicating whether a segment has been played, skipped, is playing and/or any other play state. The data may also comprise metadata associated with a segment. In this example, the "Metadata—Actor" 1006 element indicates whether a particular actor or actress (or actors or actresses) are present in a segment of a content item. An additional "Metadata—Scene Type" 1008 element may be present, indicating a scene type of the identified segment. The table may comprise any additional elements, as appropriate. In other examples, different elements may be removed, as appropriate.

The data structure 1000 may enable a media player, such as the media player described in connection with FIG. 9, to perform trick-play functionalities directly on unwatched segments of a content item. For example, the data structure 1000 may comprise a playback state table that can be created and maintained for a playback session, or plurality of playback sessions. A media player has access to time periods (e.g., beginning and end) that were skipped (or not played and/or not registered with a play state) during output of a content item. The media player may utilize the data structure to enable users to jump back and forth between unconsumed segments of a content item, without navigating through consumed content. This trick-play functionality can be optional; for example, it may be invoked if a user desires to navigate the content in such a way, for example, via setting a setting in a settings menu associated with the media player.

FIG. 11 shows a block diagram representing components of a computing device and dataflow therebetween for enabling a smart automatic skip mode during the playback of a content item. Computing device 1100 (e.g., tablet 100, 200, 300, 400, 500, 600, 700, 800, 900), as discussed above, comprises input circuitry 1104, control circuitry 1108 and output circuitry 1126. Control circuitry 1108 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 1102 by the input circuitry 1104. The input circuitry 1104 is configured to receive inputs related to a computing device. For example, this may be via an infrared controller, Bluetooth and/or Wi-Fi controller of the computing device 1100, a touchscreen, a keyboard, a mouse and/or a microphone. In another example, the input may comprise instructions received via another computing device. The input circuitry 1104 transmits 1106 the user input to the control circuitry 1108.

The control circuitry 1108 comprises a content item navigation module 1110, a metadata identification module 1114, a segment identification module 1118, a segment skipping module 1122, and a content item generation module 1128. The input is transmitted to the content item navigation module 1110, where a navigation operation is applied to a content item that is currently being output at the computing device 1100. An indication of the navigation operation is transmitted 1112 to the metadata identification module 1114, where metadata associated with segments of the content item is identified. An indication of the navigation operation and the identified metadata is transmitted 1116 to the segment identification module 1118, where a segment to skip is identified. An indication of the segment to skip is transmitted 1120 to the segment skipping module 1122 where the indicated segment of the content item is skipped. On skipping the indicated segment of the content item, a play position in the content item is transmitted 1124 to the output circuitry 1126, where the content item generation module 1128 generates the content item for output at the play position.

FIG. 12 shows a flowchart of illustrative steps involved in enabling a smart automatic skip mode during the playback of a content item. Process 1200 may be implemented on any of the aforementioned computing devices (e.g., tablet 100, 200, 300, 400, 500, 600, 700, 800, 900). In addition, one or more actions of the process 1200 may be incorporated into or combined with one or more actions of any other process or embodiments described herein.

At 1202, a content item is generated for output at a first time. At 1204, navigation input is received. At 1206, metadata associated with the content item segments is identified. At 1208, it is identified whether feedback associated with the navigation input has been received. If feedback has been received, the metadata is tagged at 1210 and the process proceeds to step 1212. If feedback has not been received at 1208, the process proceeds to step 1212. At 1212, it is determined whether a user profile is available. If a user profile is available, the user profile is accessed at 1214 and the process proceeds to step 1216. If a user profile is not available, the process processed to step 1216. At 1216, it is determined whether a single segment, or a plurality of segments, should be skipped. If a single segment is to be skipped, the segment to skip is identified at 1218, the segment is skipped at 1220 and the content item is generated for output at a second time 1222. If a plurality of segments are to be skipped, segments having common metadata are identified at 1224 and segments to skip are identified at 1226. At 1228, a segment is skipped, and the content item is generated for output at a time different from the first time at 1230. At 1232, it is determined whether there are additional segments to skip 1232. If there are additional segments to skip, the process loops to 1228 and continues to loop until all the segments are skipped. Once the final segment has been skipped, the process proceeds to 1234, where the content item is generated for output.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating, at a computing device, a content item for output at a first time;
   receiving a first input associated with navigating the content item;
   receiving a second input to provide feedback associated with the first input;
   identifying metadata associated with a plurality of segments of the content item, wherein identifying the metadata comprises:
     analyzing a frame of the content item via a trained machine learning model; and
     identifying, based on the analyzing, an element in the frame as the metadata;
   tagging the identified metadata based on the first input and the second input;
   identifying, based on the identified metadata, segments of the plurality of segments having the identified metadata as common metadata;
   identifying, based on the first input, the common metadata and the tagged metadata, a subset of the plurality of segments to skip;
   skipping a segment of the subset of segments;

generating the content item for output at a second time; and for each subsequent segment of the subset of segments, skipping a respective segment of the subset of segments as the content item progresses.

2. The method of claim 1, wherein: the method further comprises generating, for output, a selectable icon associated with the segment to skip; and the skipping further comprises skipping the identified segment in response to receiving input associated with the selectable icon.

3. The method of claim 1, wherein: the method further comprises identifying a user profile associated with the content item; and identifying the segment to skip is further based on the user profile.

4. The method of claim 1, further comprising: transmitting a request to receive an updated manifest file that does not include a reference to the segment to be skipped; receiving the updated manifest file; and requesting segments of the content item based on the updated manifest file.

5. The method of claim 1, wherein the content item is a first content item, the method further comprising: receiving a command to interrupt generating the first content item for output; generating a second content item for output; receiving, based on the segment to skip, an updated manifest file; and requesting segments of the first content item based on the updated manifest file.

6. The method of claim 1, further comprising: generating, for output, a progress bar associated with the content item; and generating an indicator for output, wherein the indicator is associated with the progress bar and the indicator indicates the skipped segment of the content item.

7. The method of claim 6, wherein: generating the indicator further comprises generating a selectable indicator; and the method further comprises, in response to receiving input associated with selecting the indicator, navigating to the skipped segment.

8. A system comprising:
a communication port;
a memory storing instructions; and
control circuitry communicably coupled to the memory and the communication port and configured to execute instructions to:
generate, at a computing device, a content item for output at a first time;
receive a first input associated with navigating the content item;
receive a second input to provide feedback associated with the first input;
identify metadata associated with a plurality of segments of the content item, wherein the control circuitry configured to identify the metadata is configured to:
analyze a frame of the content item via a trained machine learning model; and
identify, based on the analyzing, an element in the frame as the metadata;
tag the identified metadata based on the first input and the second input;
identify, based on the identified metadata, segments of the plurality of segments having the identified metadata as common metadata;
identify, based on the first input, the common metadata, and the tagged metadata, a subset of the plurality of segments to skip;
skip a segment of the subset of segments;
generate the content item for output at a second time; and
for each subsequent segment of the subset of segments, skipping a respective segment of the subset of segments as the content item progresses.

9. The system of claim 8, wherein: the control circuitry is further configured to generate, for output, a selectable icon associated with the segment to skip; and the control circuitry configured to skip the identified segment is further configured to skip the segment to skip in response to receiving input associated with the selectable icon.

10. The system of claim 8, wherein: the control circuitry is further configured to identify a user profile associated with the content item; and the control circuitry configured to identify the segment to skip is further configured to identify the segment to skip based on the user profile.

11. The system of claim 8, wherein the control circuitry is further configured to: transmit a request to receive an updated manifest file that does not include a reference to the segment to be skipped; receive the updated manifest file; and request segments of the content item based on the updated manifest file.

12. The system of claim 8, wherein the content item is a first content item and the control circuitry is further configured to: receive a command to interrupt generating the first content item for output; generate a second content item for output; receive, based on the segment to skip, an updated manifest file; and request segments of the first content item based on the updated manifest file.

13. The system of claim 8, wherein the control circuitry is further configured to: generate, for output, a progress bar associated with the content item; and generate an indicator for output, wherein the indicator is associated with the progress bar and the indicator indicates the skipped segment of the content item.

14. The system of claim 13, wherein: the control circuitry configured to generate the indicator is further configured to generate a selectable indicator; and the control circuitry is further configured to, in response to receiving input associated with selecting the indicator, navigate to the skipped segment.

* * * * *